United States Patent [19]
Tzeng

[11] Patent Number: 5,095,281
[45] Date of Patent: Mar. 10, 1992

[54] METHOD AND APPARATUS FOR DETERMINING THE ABSOLUTE NOISE FIGURE OF OPTICAL AMPLIFIERS

[75] Inventor: Liang D. Tzeng, Fogelsville, Pa.

[73] Assignee: AT&T Bell Laboratories, Murray Hill, N.J.

[21] Appl. No.: 611,606

[22] Filed: Nov. 13, 1990

[51] Int. Cl.$^5$ .................. H03F 17/00; G01R 23/00
[52] U.S. Cl. .................................. 330/2; 324/77 K; 330/59
[58] Field of Search .................. 330/2, 59, 308; 324/77 K; 356/72, 73

[56] References Cited

U.S. PATENT DOCUMENTS 5,034,678 7/1991 Eichen et al. .................. 324/77 K

OTHER PUBLICATIONS

"5.2 dB Noise Figure in a 1.5 μm InGaAsP ...", *Elec. Lett.*, vol. 23, No. 5, Feb. 1987, T. Mukai et al., pp. 216–218.
"Wavelength Dependence of Noise Figure ...", *Elec. Lett.*, vol. 24, No. 2, Jan. 1988, M. G. Oberg et al., pp. 99–100.
"Measurement of Semiconductor Laser Amplifier Noise Figure ...", *Elec. Lett.*, vol. 25, No. 25, Dec. 1989, pp. 1681–1682.

*Primary Examiner*—James B. Mullins
*Attorney, Agent, or Firm*—Wendy W. Koba

[57] ABSTRACT

A test apparatus and method is disclosed for determining the absolute noise figure of an optical amplifier. The apparatus comprises an optical receiver and functions to measure the output power of a test noise source, such as a lamp or LED. A plot of input power versus output power yields a linear relationship, with a y-intercept at the test apparatus (first) noise floor ($N_0$). An optical amplifier to be tested is then inserted in the signal path between the noise source and the receiver. A new plot is generated and a second system noise floor value is determined ($N_1$). The difference between the two noise floor values ($N_1 - N_0$) is then defined as the amplifier absolute noise figure ($N_A$). The inventive technique is equally applicable to semiconductor and fiber optical amplifiers.

30 Claims, 2 Drawing Sheets

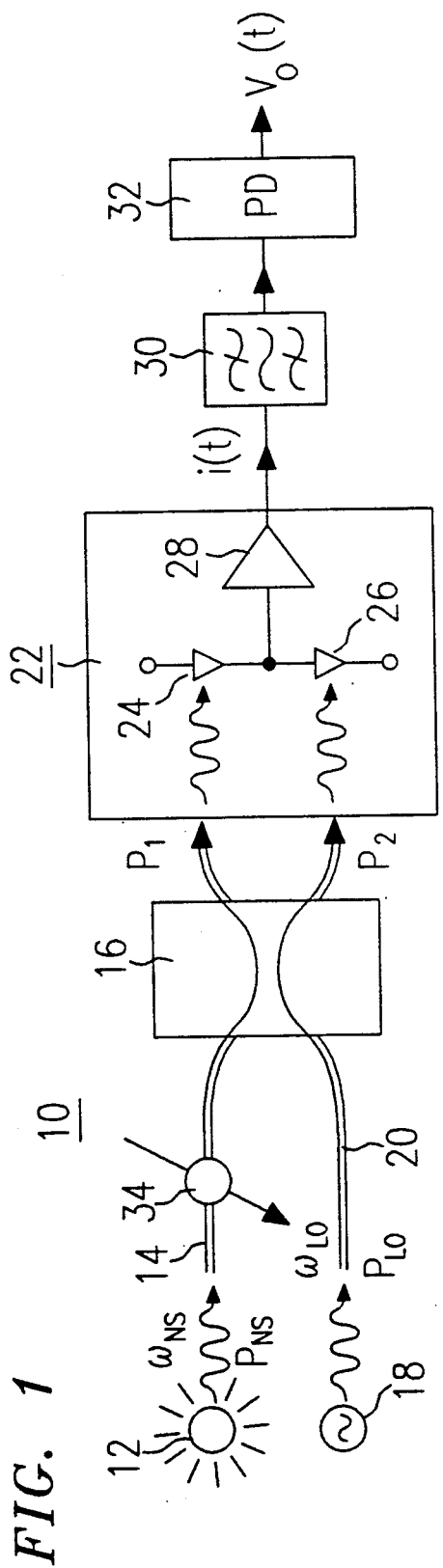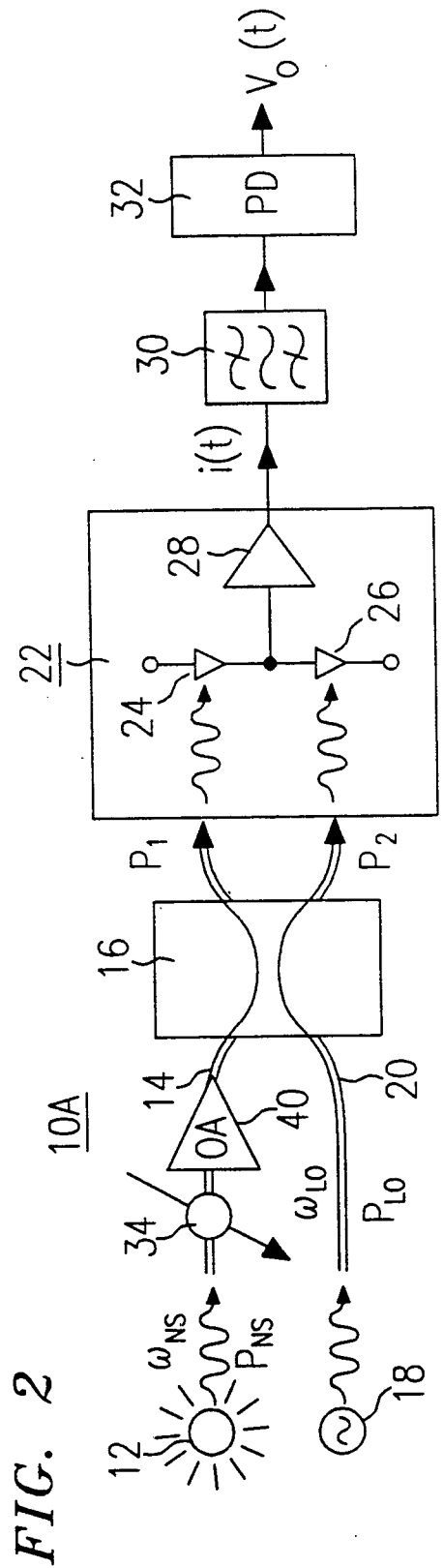

METHOD AND APPARATUS FOR DETERMINING THE ABSOLUTE NOISE FIGURE OF OPTICAL AMPLIFIERS

BACKGROUND OF THE INVENTION

1. Technical Field

The present invention is related to the field of optical amplifiers and, more particularly, to a method and apparatus for determining the absolute noise figure of optical amplifiers.

2. Description of the Prior Art

For many communication applications utilizing optical amplifiers, it is important to know the noise figure of the optical amplifier itself. In particular, the amplifier noise figure is an important factor in determining the input power required to maintain a given bit error rate (BER). In effect, the noise figure is a measure of the amplifier's sensitivity and is a useful parameter to determine when the amplifier is used as a pre-amp in an optical receiver.

An article entitled "Measurement of Semiconductor Laser Amplifier Noise Figure in Coherent Optical Transmission System", by G. R. Walker et al., appearing in *Electronics Letters*, Vol. 25, No. 25, December 1989 at pp. 1681-2 describes two different techniques for determining the noise figure of semiconductor laser optical amplifiers. The first technique utilizes the direct measurement of the ratio of the amplifier gain to the spontaneous emission spectral density. Various other broadband noise sources, such as the noise floor of the analyzer itself, local oscillator shot noise, spontaneous shot noise, spontaneous-spontaneous beat noise, and local oscillator-spontaneous beat noise, were cited by the authors as being superimposed on the desired quantity, with only the local oscillator-spontaneous beat portion capable of being separately calculated and removed. The alternative determination technique related to the operation of a semiconductor amplifier in a 565 Mbit/s heterodyne transmission system. Again assuming that various other noise source contributions would be minimal, the amplifier noise figure was determined by evaluating the input/output signal power ratio.

An obvious limitation on both of these approaches is the assumption regarding the relative contribution of the various other noise sources, and the resultant error in the calculated noise figure from the presence of the other noise sources.

Therefore, a need remains in the art for a method of determining the noise figure of an optical amplifier which provides a result that is essentially independent of the various other noise sources within the system.

SUMMARY OF THE INVENTION

The need remaining in the art is addressed by the present invention which relates to optical amplifiers and, more particularly, to a method and apparatus for determining the absolute noise figure of an optical amplifier.

In accordance with one embodiment of the present invention, a test arrangement is utilized which consists of a "noise" source applied as an input to an optical receiver and a power detector coupled to the receiver output. Illustratively, the power of the input noise source is varied and the change in power detector output as a function of the input noise power variation is measured. A plot of the power detector output vs. input "noise" power results in an essentially linear relationship, with a y-intercept (i.e., input noise=0) at the test system noise floor, $N_0$. The arrangement further comprises means for allowing an optical amplifier to be inserted in the test arrangement between the noise source and the optical receiver. After insertion, the input noise power is again varied and a plot is generated for the test arrangement. The new plot yields a y-intercept (noise floor) at a value $N_1$ greater than $N_0$. Subtracting $N_0$ from $N_1$ then provides the absolute noise figure contribution of the optical amplifier.

An advantage of the present invention is that the test arrangement may be utilized with virtually any type of optical amplifier, for example, semiconductor laser optical amplifiers or erbium-doped fiber amplifiers.

Another advantage is that various other noise contributions (such as the shot noise and beat noise sources mentioned above) are canceled, since the test arrangement and method rely only the difference between two noise floor values, where both values incorporate virtually identical system noise components.

Other and further advantages of the present invention will become apparent during the course of the following discussion and by reference to the accompanying drawings.

BRIEF DESCRIPTION OF THE DRAWING

Referring now to the drawings,

FIG. 1 is an exemplary test arrangement useful in accordance with the teachings of the present invention to determine the absolute noise figure of an optical amplifier, the arrangement as illustrated utilized to determine the noise floor $N_0$ of the test arrangement;

FIG. 2 illustrates the exemplary test arrangement of FIG. 1, with the addition of an optical amplifier in the input signal path, the arrangement as shown in FIG. 2 utilized to determine the noise floor $N_1$ of the combination of the amplifier and the test arrangement.

DETAILED DESCRIPTION

Figure 3:
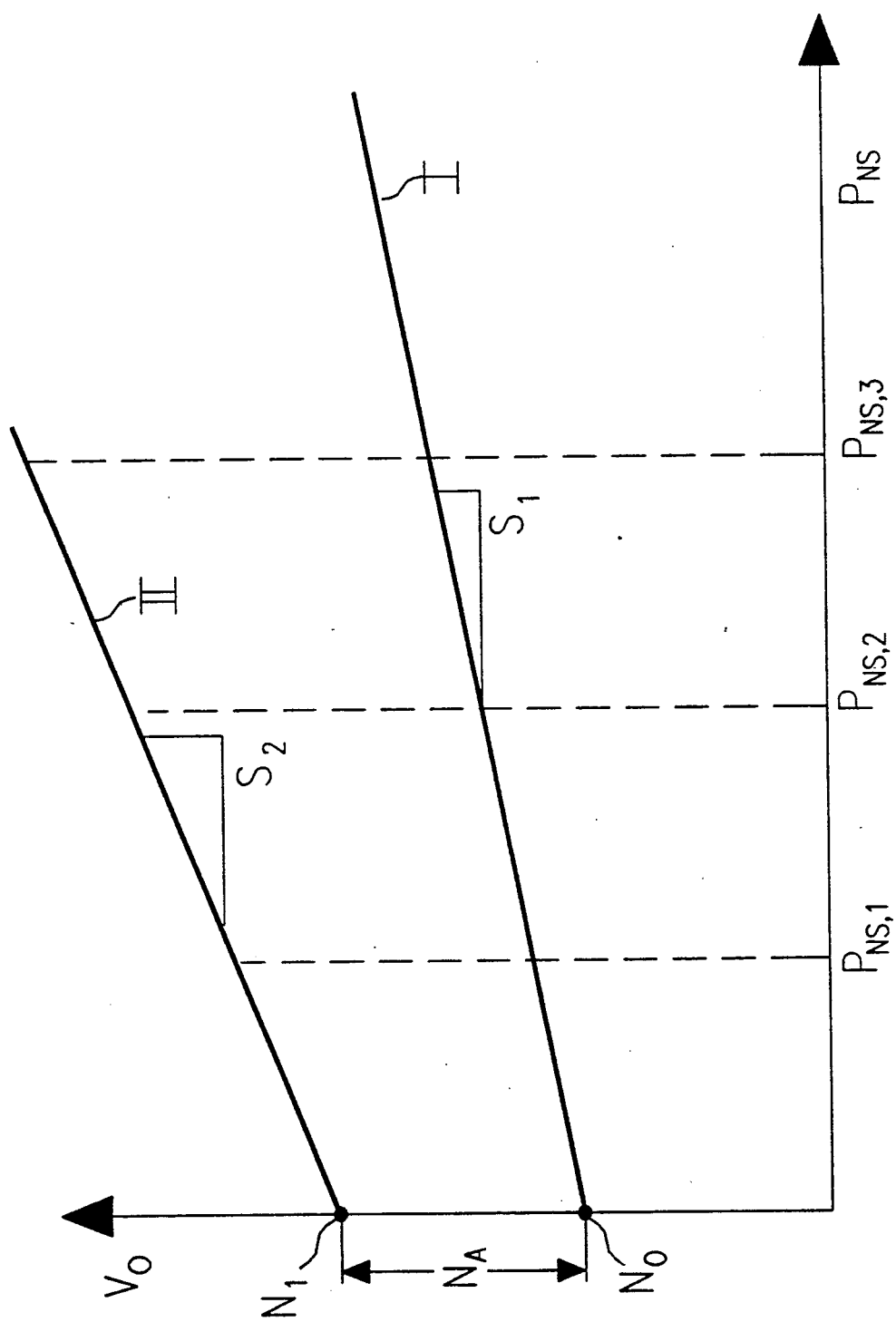
FIG. 3 includes plots of input noise power ($P_{NS}$) vs. power detector output ($V_o$) for the arrangements of FIGS. 1 and 2, illustrating in particular the y-intercepts of both arrangements, as well as the y-intercept difference ($N_1 - N_0$), the latter value being defined as the absolute noise figure $N_A$ of the optical amplifier.

FIG. 1 illustrates an exemplary test arrangement 10 which may be used in determining the absolute noise figure of an optical amplifier in accordance with the teachings of the present invention. Arrangement 10 includes a noise source 12, operating at a frequency $\omega_{NS}$ with a power level $P_{NS}$. Noise source 12 may comprise a lamp, LED, or any other optical source suitable for providing a constant optical signal of known power. The output from noise source 12 is coupled into a first signal path 14 (for example, optical fiber or integrated optical waveguide) and is subsequently applied as a first input to an optical coupler 16, for example, a 3 dB optical coupler. The remaining input to optical coupler 16 comprises a local oscillator 18 operating at a frequency $\omega_{LO}$ with a power level $P_{LO}$. Local oscillator 18 is coupled to optical coupler 16 by a second optical signal path 20. As is well-known in the art, optical coupler 16 will produce a pair of output signals which may generally be represented as follows:

$$P_1 = P_{NS} + jP_{LO},$$

and $$P_2 = jP_{NS} + P_{LO}.$$

Output signals $P_1$ and $P_2$ from coupler 16 are subsequently applied as separate inputs to an optical receiver 22. In the exemplary embodiment of FIG. 1, a balanced receiver configuration is utilized. Simply, balanced receiver 22 comprises a pair of photodiodes 24,26 connected in opposite polarity, with photodiode 24 being responsive to the light signal $P_1$ and photodiode 26 being responsive to the light signal $P_2$. In the opposite polarity configuration, the input signals will be summed such that any common mode signals (such as the intensity noise generated by local oscillator 18) will be canceled. The sum of the photocurrent outputs from photodiodes 24,26 is subsequently passed through an amplifier 28 to form the output current i(t) of receiver 22. Output current i(t) from balanced receiver 22 will thus be proportional to the quantity $\sqrt{P_{NS}P_{LO}} \cos[(\omega_{LO}-\omega_{NS})t]$, with additional terms at various harmonics. A bandpass filter 30 may be utilized to remove these harmonic components and provide a signal i'(t) which is bandlimited to $\omega_{LO} \pm \omega_{NS}$. It is to be understood, however, that such filtering is only exemplary, and is not required by the measuring technique of the present invention. The output current i'(t) from bandpass filter 30 is then applied as an input to power detector 32. In one embodiment, power detector 32 may comprise a Schottky diode detector, a thermal couple detector, or any suitable high sensitivity microwave power detector. Power detector 32 subsequently provides as an output a voltage $V_o(t)$ which is proportional to the quantity $P_{NS}P_{LO} \cos \Delta\omega t$, where $\Delta\omega = \omega_{NS} \pm \omega_{LO}$.

In order to determine the noise floor of arrangement 10 in accordance with the teachings of the present invention, the input noise power level $P_{NS}$ is varied and the resultant variation in voltage $V_o(t)$ from power detector 32 is measured. In the exemplary embodiment of FIG. 1, the input power level is varied utilizing an attenuator 34 disposed in first optical signal path 14 between noise source 12 and optical coupler 16. In particular, attenuator 34 may be adjusted to provide a predetermined noise power level $P_{NS,1}$ to receiver 22, resulting in a measured power detector output $V_{o,1}$. Attenuator 34 may then be further adjusted to provide a second, different noise power level $P_{NS,2}$ which results in a second measured power detector output $V_{o,2}$. In accordance with the teachings of the present invention, at least two such measurements are required. It is to be understood, however, that increasing the number of measurements may result in increasing the accuracy of the final determination of the optical amplifier noise figure.

FIG. 3 illustrates the graphical relationship between the input noise power levels and the measured power detector outputs described above. In particular, plot I illustrates the relationship between output voltage $V_o$ and input noise power $P_{NS}$ for arrangement 10 of FIG. 1, illustrating in particular a set of three set input power levels and their associated measured power detector outputs. As shown, the relationship is essentially linear, with a slope $S_1$ related to the system gain. The y-intercept $N_0$, determined at zero input power (i.e., $P_{NS}=0$), is thus defined as the system noise floor.

Once the system noise floor $N_0$ has been determined, the noise figure of an exemplary optical amplifier may be ascertained. To accomplish this, arrangement 10 of FIG. 1 is modified to include an optical amplifier along the input signal path. FIG. 2 illustrates test arrangement 10A including an exemplary optical amplifier 40 disposed along first signal path 14 between attenuator 34 and optical coupler 16. The operation of amplified arrangement 10A with the insertion of optical amplifier 40 is essentially identical to that associated with arrangement 10 of FIG. 1. This is, attenuator 34 is adjusted a number of times to provide a series of at least two different input noise power levels. The associated outputs from power detector 32 are measured and the relationship of output to input is plotted. In particular, plot II of FIG. 3 illustrates the relationship between input noise power level and power detector output for arrangement 10A of FIG. 2. As shown, plot II exhibits an increased slope $S_2$ with respect to plot I, related to the gain G of optical amplifier 40, where $G=S_2/S_1$. Further, amplified test arrangement 10A is seen to comprise a larger, in magnitude, noise floor $N_1$.

In accordance with the teachings of the present invention, the absolute noise figure of optical amplifier 40 may therefore be ascertained by subtracting the test arrangement noise floor $N_0$ from the amplified arrangement noise floor $N_1$. The difference $N_1-N_0$, denoted $N_A$ and illustrated in FIG. 3, is therefore the absolute noise figure of optical amplifier 40. Since the various other noise contributions (e.g., local oscillator-spontaneous beat noise, spontaneous shot noise, etc.) will be present in both factors $N_0$ and $N_1$, they will cancel during the subtraction process to yield the absolute noise figure $N_A$.

It is to be understood that the measurement scheme of the present invention is applicable to semiconductor laser optical amplifiers, fiber amplifiers, or any other system which may be utilized to provide optical amplification. Additionally, as noted above, the receiver arrangement of the scheme may be a balanced receiver as shown in the drawings, or any other suitable type of optical receiver. Various other modifications to the arrangements depicted in FIGS. 1 and 2 may be contemplated, including other means of providing coupling of the input signals, input power attenuation, and/or output power detection, and are considered to fall within the spirit and scope of the present invention.

I claim:

1. An arrangement for determining the absolute noise figure of an optical amplifier, the arrangement comprising an optical receiver;
means for applying the output from an optical noise source as an input to said optical receiver;
means for inserting an optical amplifier in the signal path between the noise source and the optical receiver; and
means for determining a first noise floor value ($N_0$) of said arrangement without the optical amplifier present and determining a second noise floor value ($N_1$) of said arrangement with said optical amplifier present, the difference between the second and first noise floor values ($N_1-N_0$) being defined as the optical amplifier absolute noise figure ($N_A$).

2. An arrangement as defined in claim 1 wherein the optical receiver comprises a balanced receiver.

3. An arrangement as defined in claim 2 wherein the arrangement further comprises
local oscillator means for providing as an output an optical signal having a predetermined frequency $\omega_{LO}$ and a predetermined power level $P_{LO}$; and coupling means for receiving as separate inputs the output of the noise source and the output of the local oscillator means and providing as a pair of outputs first and second optical signals representative of combinations of the input signals, the first and second coupling means output signals being applied as separate inputs to the balanced receiver.

4. An arrangement as defined in claim 3 wherein the balanced receiver comprises a first photodiode coupled to receive the first coupling means output signal and generating as an output a first photocurrent related thereto;

a second photodiode coupled to receive the second coupling means output signal and generating as an output a second photocurrent related thereto, the first and second photodiodes disposed in an opposite polarity arrangement such that a common output from the photodiodes is a photocurrent representative of the sum of the input signals applied thereto; and amplifying means responsive to the sum photocurrent from the first and second photodiodes to form as an output of the balanced receiver an amplified current representative of the sum of the input photocurrents.

5. An arrangement as defined in claim 1 wherein the noise floor determining means comprises output power detecting means coupled to the output of the optical receiver for measuring said optical receiver output power and comparing and receiver output power to the input noise power and;

input power adjusting means coupled to the noise source for varying the power level of the input noise signal such that the output power value at a zero level input power may be determined, the output power value for zero input power defined as the noise floor of the arrangement.

6. An arrangement as defined in claim 5 wherein the output power detecting means comprises Schottky diode power detector.

7. An arrangement as defined in claim 5 wherein the input power adjusting means comprises an optical attenuator disposed in the input optical signal path.

8. An arrangement as defined in claim 5 wherein the arrangement further comprises filtering means disposed in the output signal path between the optical receiver and the output power detecting means.

9. An arrangement as defined in claim 1 wherein the input noise source comprises an LED.

10. An arrangement as defined in claim 1 wherein the input noise source comprises a lamp.

11. An arrangement as defined in claim 1 wherein the inserting means includes optical fibers capable of connecting the optical amplifier between the noise source and the optical receiver.

12. An arrangement as defined in claim 1 wherein the arrangement includes optical coupling means for providing the interconnection between the input noise source and the optical receiver.

13. An arrangement as defined in claim 12 wherein the optical coupling means comprises a 3 dB optical coupler.

14. An arrangement as defined in claim 1 wherein the inserting means is utilized to connect a semiconductor optical amplifier to the arrangement.

15. An arrangement as defined in claim 14 wherein the fiber amplifier comprises an erbium-doped fiber amplifier.

16. An arrangement as defined in claim 1 wherein the inserting means is utilized to connect a fiber amplifier to the arrangement.

17. Apparatus for determining the absolute noise figure of an optical amplifier, the apparatus comprising:

a noise source operating at a frequency $\omega_{NS}$;

a local oscillator operating at a different frequency $\omega_{LO}$;

an optical coupler for receiving as separate input signals the output signals from the noise source and the local oscillator to provide first and second output signals representative of the combination of said separate input signals;

a balanced optical receiver for receiving as separate inputs the first and second output signals from said optical coupler and generating as an output a photocurrent ($i(t)$) related to the sum thereof;

attenuating means disposed between the noise source and the optical coupler for adjusting said noise source to provide a plurality of different power levels;

power detecting means coupled to the output of said balanced receiver for measuring changes in receiver output power as a function of the changes in the noise input power, and means for inserting an optical amplifier in the signal path between the attenuating means and the balanced receiver such that the power detecting means is capable of measuring output power values for the apparatus both with and without the optical amplifier in the signal path such that the difference between the arrangements at zero input noise power level defines the absolute noise figure of the inserted optical amplifier.

18. A method of determining the absolute noise figure of an optical amplifier, the method comprising the steps of:

a) measuring the output power level of an optical receiver for a set of at least two different input power levels;

b) determining a first noise floor of the receiver by extrapolating the values from step a) to the output power (noise floor) for a zero input power level;

c) inserting an optical amplifier in the input signal path;

d) repeating steps a) and b) for the arrangement of step c) to determine a second noise floor; and e) subtracting the first noise floor value from the second noise floor value to define the absolute noise figure of the optical amplifier.

19. The method of claim 18 wherein in performing step a), the following steps are performed:

$a_1$) providing a power detecting means at the optical receiver output; and $a_2$) generating a voltage proportional to the power of the input applied thereto.

20. The method of claim 19 wherein step a) is further characterized by using a Schottky diode power detecting means for measuring the output power level.

21. The method of claim 18 wherein step c) is further characterized by inserting a semiconductor laser optical amplifier in the input signal path.

22. The method of claim 18 wherein step c) is further characterized by inserting a fiber amplifier in the input signal path.

23. A method for determining the absolute noise figure of an optical amplifier, the method comprising the steps of:

a) providing an input noise source;
b) providing an optical receiver arrangement;
c) coupling the input noise source to the optical receiver;
d) determining a first system noise floor $N_0$;
e) inserting an optical amplifier in the signal path between the noise source and the optical receiver;
f) repeating steps c) and d) to determine the a second system noise floor $N_1$; and
g) subtracting the value of step f) from the value of step e) to generate the optical amplifier absolute noise figure $N_A$.

24. The method of claim 23 wherein in performing step d), the following steps are followed:
d1) setting the input noise source power level to a predetermined value $P_{NS,i}$;
d2) measuring the optical receiver output level $V_{o,i}$ for the input noise power level of step d1);
d3) performing steps d1) and d2) a number of times sufficient to determine the function relating the two quantities; and
d4) extrapolating the function of step d3) to determine the optical receiver output value for a zero input noise level, defined as the first noise floor.

25. The method of claim 24 wherein in performing step d2), the following steps are performed:
providing a power detecting means at the optical receiver output; and
generating a voltage proportional to the power of the input applied thereto.

26. The method of claim 23 wherein step a) is characterized by providing an LED as the input noise source.

27. The method of claim 23 wherein step a) is characterized by providing a lamp as the input noise source.

28. The method of claim 23 wherein step b) is characterized by providing a balanced optical receiver as the optical receiver arrangement.

29. The method of claim 23 wherein step e) is characterized by inserting a semiconductor optical amplifier in the signal path.

30. The method of claim 23 wherein step e) is characterized by inserting a fiber amplifier in the signal path.

* * * * *